United States Patent
Stricker et al.

(10) Patent No.: US 10,453,146 B1
(45) Date of Patent: Oct. 22, 2019

(54) HOME ASSESSMENT AND ISSUE PROBABILITY GENERATION

(71) Applicant: Allstate Insurance Company, Northbrook, IL (US)

(72) Inventors: Kurt M. Stricker, Northfield, IL (US); Beverly Landry-Gonzalez, Gurnee, IL (US); Nicolette de Guia, Chicago, IL (US); Mark E. Faga, Evanston, IL (US); Kelly Ann Brennan, Lake Zurich, IL (US); Robert H. Johnson, Hoffman Estates, IL (US)

(73) Assignee: Allstate Insurance Company, Northbrook, IL (US)

( * ) Notice: Subject to any disclaimer, the term of this patent is extended or adjusted under 35 U.S.C. 154(b) by 685 days.

(21) Appl. No.: 14/497,715

(22) Filed: Sep. 26, 2014

(51) Int. Cl.
*G06Q 40/08* (2012.01)
*G06Q 40/00* (2012.01)
*G06N 7/00* (2006.01)

(52) U.S. Cl.
CPC ............ *G06Q 40/08* (2013.01); *G06N 7/005* (2013.01)

(58) Field of Classification Search
USPC .............................................. 705/4; 340/350
See application file for complete search history.

(56) References Cited

U.S. PATENT DOCUMENTS

| | | | |
|---|---|---|---|
| 6,766,322 B1 | 7/2004 | Bell | |
| 7,580,862 B1 * | 8/2009 | Montelo | G06Q 10/10 705/26.1 |
| 7,698,213 B2 | 4/2010 | Lancaster | |
| 7,765,118 B1 | 7/2010 | Bohanek | |
| 7,809,587 B2 * | 10/2010 | Dorai | G06Q 40/08 703/6 |
| 8,106,769 B1 * | 1/2012 | Maroney | G06Q 10/10 340/540 |
| 8,229,767 B2 | 7/2012 | Birchall | |

(Continued)

FOREIGN PATENT DOCUMENTS

EP 1259921 A1 11/2002

OTHER PUBLICATIONS

"Flood risk and insurance: A roadmap to 2013 and beyond" Final report of the flood insurance working groups, Dec. 2011, Department for Environment, Food and Rual Affairs.

(Continued)

*Primary Examiner* — Kelly S Campen
(74) *Attorney, Agent, or Firm* — Banner & Witcoff, Ltd.

(57) ABSTRACT

Systems, methods, apparatuses and computer-readable media for receiving data associated with a structure or home are provided. Data may be received from an insurance provider, from publicly available sources and/or from a user. The data may include information about the structure and/or items within the structure, as well as a locality in which the structure is located, and/or other structures in the locality or neighborhood. The data may be used to assess items associated with the structure to determine a probability that an item may have an issue. Other aspects relate to receiving a request for assistance from a user in identifying a cause of an issue and remedying the issue. In some examples, the received data associated with the structure may be aggregated with data from the user about the issue in order to identify a cause of the issue and develop an action plan to address the issue.

10 Claims, 8 Drawing Sheets

(56) References Cited

U.S. PATENT DOCUMENTS

| | | | |
|---|---|---|---|
| 8,229,769 | B1 | 7/2012 | Hopkins, III |
| 8,271,308 | B2 | 9/2012 | Winkler |
| 8,289,160 | B1 | 10/2012 | Billman |
| 8,346,578 | B1 | 1/2013 | Hopkins, III et al. |
| 8,423,548 | B1 | 4/2013 | Trandal et al. |
| 8,484,046 | B1 | 7/2013 | Bauer et al. |
| 8,510,147 | B2 | 8/2013 | Mitra et al. |
| 8,510,196 | B1 | 8/2013 | Brandmaier et al. |
| 8,515,788 | B2 | 8/2013 | Tracy et al. |
| 8,600,104 | B2 | 12/2013 | Brown |
| 8,650,106 | B1 | 2/2014 | Hopkins, III |
| 9,002,719 | B2* | 4/2015 | Tofte .............. G06Q 40/08 705/4 |
| 2005/0071376 | A1 | 3/2005 | Modi |
| 2008/0030322 | A1* | 2/2008 | Stauffer .............. G06Q 10/087 340/539.2 |
| 2008/0201161 | A1 | 8/2008 | Kearns et al. |
| 2008/0255862 | A1 | 10/2008 | Bailey et al. |
| 2008/0306799 | A1* | 12/2008 | Sopko, III .............. G06Q 10/06 705/7.12 |
| 2009/0006185 | A1* | 1/2009 | Stinson .............. G06Q 10/10 705/306 |
| 2009/0138290 | A1 | 5/2009 | Holden |
| 2009/0177500 | A1* | 7/2009 | Swahn .............. G06Q 40/08 705/4 |
| 2009/0265193 | A1 | 10/2009 | Collins et al. |
| 2011/0161119 | A1 | 6/2011 | Collins |
| 2012/0179431 | A1 | 7/2012 | Labrie et al. |
| 2012/0221371 | A1 | 8/2012 | Hegazy et al. |
| 2012/0297337 | A1 | 11/2012 | St. Denis et al. |
| 2012/0311053 | A1 | 12/2012 | Labrie et al. |
| 2013/0041841 | A1* | 2/2013 | Lyons .............. G06Q 50/16 705/36 R |
| 2013/0096960 | A1* | 4/2013 | English .............. H04L 61/2007 705/4 |
| 2013/0144658 | A1 | 6/2013 | Schnabolk et al. |
| 2013/0201018 | A1 | 8/2013 | Horstemeyer et al. |
| 2013/0226624 | A1 | 8/2013 | Blessman et al. |
| 2013/0253987 | A1 | 9/2013 | Hamann |
| 2013/0262029 | A1* | 10/2013 | Pershing .............. G06Q 10/06 702/156 |
| 2013/0262153 | A1 | 10/2013 | Collins et al. |
| 2013/0339065 | A1 | 12/2013 | Denning et al. |
| 2014/0019166 | A1 | 1/2014 | Swanson et al. |
| 2014/0279225 | A1* | 9/2014 | Friedman .............. G06Q 30/0609 705/26.35 |
| 2015/0088556 | A1 | 3/2015 | Convery et al. |
| 2015/0093047 | A1 | 4/2015 | Battcher et al. |
| 2015/0235322 | A1 | 8/2015 | Emison |
| 2015/0287152 | A1 | 10/2015 | Oakes |

OTHER PUBLICATIONS

Mar. 24, 2017—U.S. Non-Final Office Action—U.S. Appl. No. 14/497,539.
Jul. 25, 2017—U.S. Final Office Action—U.S. Appl. No. 14/497,539.
"11 Wood-Flooring Problems and their Solutions", Fine Homebuilding, Peterson, Charles, Dec. 2008/Jan. 2009 accessible from <http://www.finehomebuilding.com/pdf>, the online version accessible from <http://www.finehomebuilding.com/2008/11/12/11-wood-flooring-problems-and-their-solutions>.
Nov. 30, 2017—U.S. Non-Final Office Action—U.S. Appl. No. 14/497,539.
Sep. 28, 2018—U.S. Non-Final Office Action—U.S. Appl. No. 14/497,539.
"Real-Time", thefreedictionary.com, archived on Apr. 10, 2014, available at <https://web.archive.org/web/20140410000627/https://www.thefreedictionary.com/real-time>, Year 2014.
Jun. 11, 2018—U.S. Final Office Action—U.S. Appl. No. 14/497,539.
Aug. 5, 2019—U.S. Non-Final Office Acton—U.S. Appl. No. 14/497,539.
"Real-Time Traffic Transmission Over the Internet", Furini and Towsley, Lecture Notes in Computer Science, Networking 20000: Broadband Communications, High Performance Networking, and Performance of Communication Networks, Springer Verlag, May 2000, pp. 483-494, Year: 2000.

* cited by examiner

HOME ASSESSMENT AND ISSUE PROBABILITY GENERATION

TECHNICAL FIELD

Aspects of the disclosure generally relate to evaluating systems in a home or structure. For instance, various aspects relate to conducting a home assessment and identifying issues and/or determining a likelihood that an issue will occur.

BACKGROUND

A home or structure often includes various systems, structural features, appliances, etc. that, over the years, may require repair, replacement, or the like. However, it is often difficult to predict when these items will fail or require repair or replacement. That is particularly an issue when a homeowner is unfamiliar with the items, how they work, how long they typically last before repair/replacement is needed, etc. Having information associated with a likelihood of an issue occurring with one or more of these items may be beneficial to the user.

Further, some user's might not be familiar enough with the various items in a home to understand an issue when it occurs, what the cause is, how to address it, and the like. Having assistance when an issue arises may aid the user in handling the issue and minimize damage associated with the issue.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects described herein relate to systems, methods, apparatuses, and computer-readable media for receiving data associated with a structure or home. In some examples, data may be received from an insurance provider associated with the structure, from publicly available sources and/or from a user. The data may include information about the structure and/or items within the structure, as well as a locality or neighborhood in which the structure is located, and/or other structures in the locality of neighborhood. The data may be used to assess items associated with the structure to determine a probability or likelihood that one or more items may have a failure or issue.

Other aspects relate to receiving a request for assistance from a user in identifying a cause of an issue and steps to take to remedy the issue. In some examples, the received data associated with the structure, neighborhood and/or other structures may be aggregated with data received from the user about the issue in order to identify a cause of the issue and develop an action plan to address the issue.

Still other aspects relate to providing an insurance rate request to a user. Providing the insurance rate request may include receiving data from the user associated with a condition of the structure and/or the various items within the structure. That data may be aggregated with other received data associated with the structure, neighborhood and/or other structures within the neighborhood to generate an insurance rate quote.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
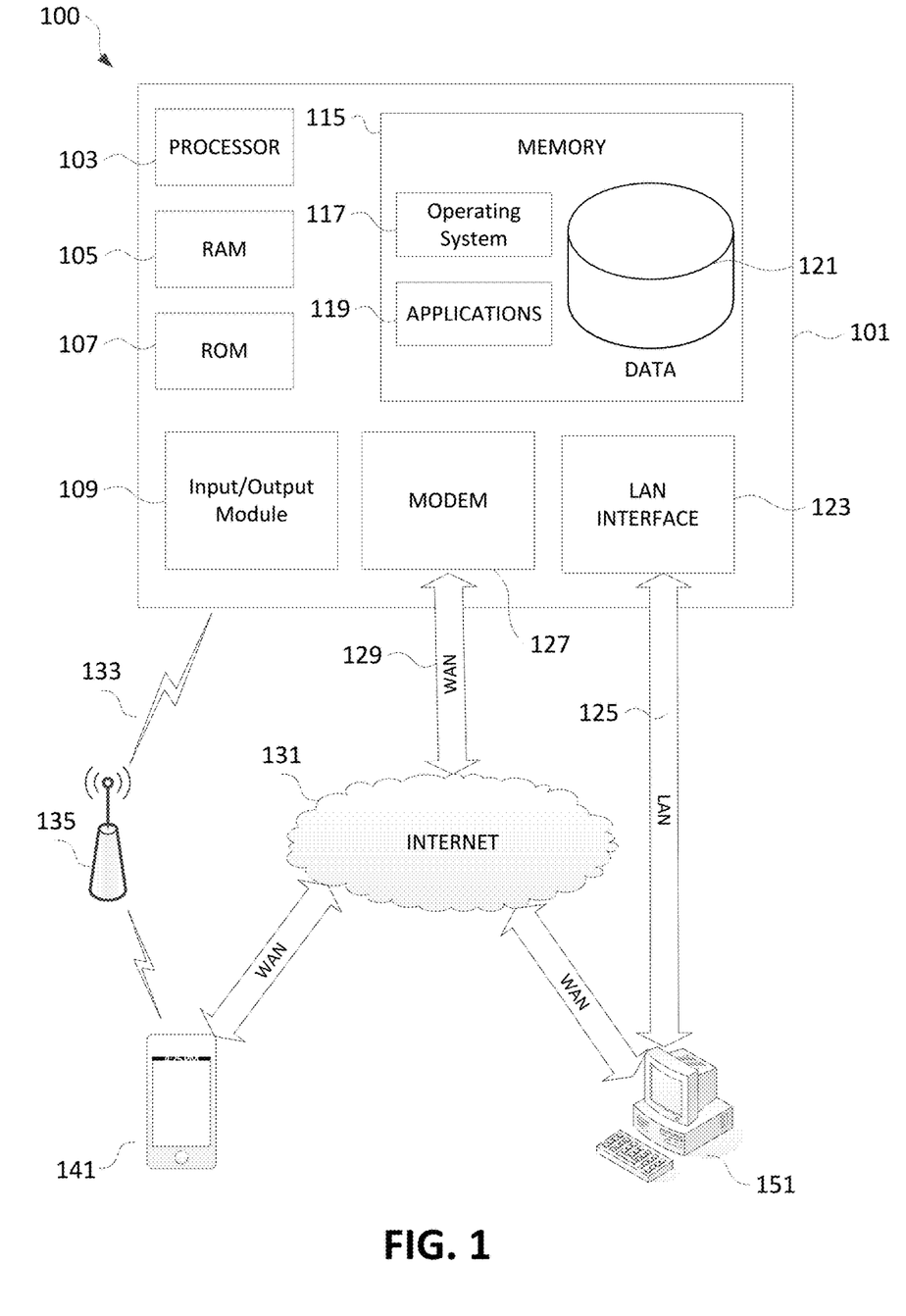
FIG. 1 illustrates a network environment and computing systems that may be used to implement aspects of the disclosure.

FIG. 1 illustrates a block diagram of a computing device (or system) 101 in communication system 100 that may be used according to one or more illustrative arrangements of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to various servers or systems, such as a system or systems for evaluating or assessing one or more items associated with a home or structure, identifying a probability that an issue will occur with the one or more items associated with the home or structure, generating a plan to address any issues, and the like. Such systems may be configured as described herein for receiving data associated with a structure, receiving additional data associated with the locality or neighborhood of the structure or other structures within the locality or neighborhood, receiving data associated with one or more items associated with the structure, etc., to determine a probability that an issue will occur or to assist in identifying a cause of and/or a plan to address an existing problem or issue. The systems may also be configured to generate an insurance quote for a structure.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the system 101 to execute a series of computer-readable instructions to receive data associated with a structure, locality, neighborhood, one or more items associated with the structure, etc., create determine a probability that an issue will occur, to determine a cause of an existing issue, to create an action plan to address a current issue, and the like based on the data. In some examples, the computer-readable instructions may also be configured to receive data in order to determine an insurance quote for a structure.

The system 101 may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to system 101. The network connections depicted in FIG. 1 include a local area network (LAN) 125 and a wide area network (WAN) 129, and a wireless telecommunications network 133, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, portable computing devices, and the like) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, WiMAX, and wireless mesh networks, is presumed, and the various computing devices and system components described herein may be configured to communicate using any of these network protocols or technologies.

Additionally, one or more application programs 119 used by the system 101 may include computer-executable instructions (e.g., analysis of information received related to items associated with the structure, determining probability of issue occurring based on various data, etc.) for receiving data associated with a structure, locality, additional structures within the locality and/or one or more items associated with the structure, analyzing the data to determine a probability model of an issue occurring, identify a cause of an existing issue and/or an action plan to address and existing issue, prioritize issues, and/or generating insurance rates, adjustments, incentives, etc. based on the data.

The systems described herein may be used by an insurance company, financial institution or other entity to monitor and/or track activity associated with one or more structures. Although many examples herein will be described as being used in conjunction with an insurance company, the systems and methods described herein may be used by or with other entities or types of entities without departing from the invention. Further, although many examples discussed herein will be discussed in the context of a home (e.g., a home of a user), the systems, methods, arrangements, etc. described herein may be used to assess any structure or type of structure without departing from the invention.

Various structures, such as homes, include several systems, features, structural aspects, items, and the like, that should be assessed, at least periodically, to ensure that they are safe, secure and functioning as expected. Although it may not be possible to know exactly when an issue will arise with an item within a structure, historical data, as well as data associated with the structure, may be used to develop a probability model of when an issue is likely to arise.

Further, often, when an issue does arise, a homeowner is unsure of what steps to take to address the issue. Accordingly, aspects described herein relate to providing assistance to users via, for example, a computing device, to aid in identifying a cause of the issue and developing an action plan to address the issue.

Further still, a user may be interested in obtaining an insurance rate quote. Aspects described herein may permit a user, via a computing device, to transmit data, video, images, and the like, to a system to generate an insurance rate quote.

These and various other arrangements will be discussed in more detail below.

Figure 2:
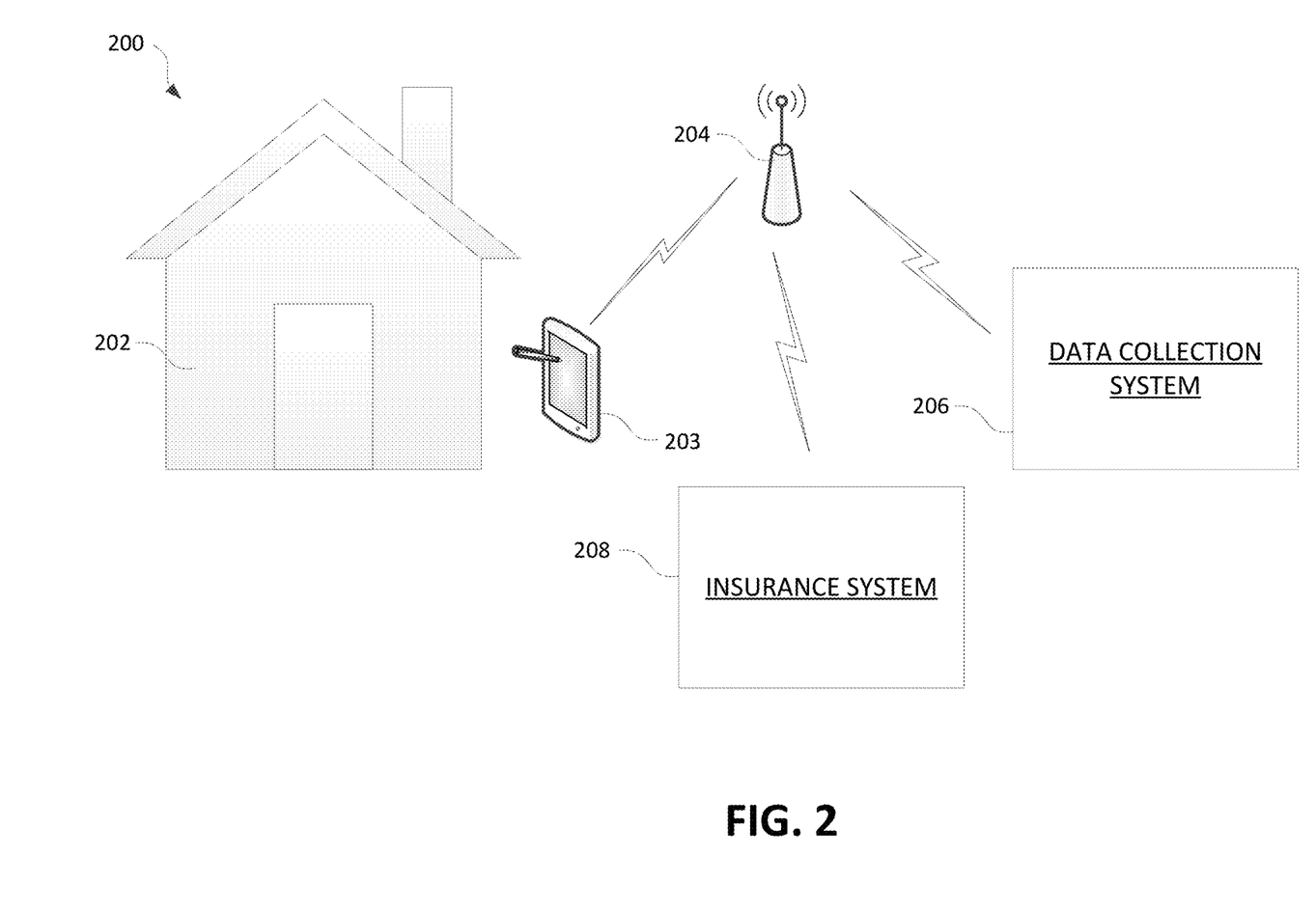
FIG. 2 is a schematic diagram of an example home assessment arrangement according to one or more aspects described herein.

In some arrangements, a system, such as a home assessment system, may be implemented by an entity. In some examples, the entity may be an insurance company. FIG. 2 is a schematic illustration of a home assessment arrangement according to one or more aspects described herein. As shown in FIG. 2, the arrangement 200 may include a home or other structure 202. The home or structure 202 may generally include a variety of systems, features, items, etc. that may be evaluated to determine a likelihood of an issue arising. For instance, a home or other structure 202 may have one or more mechanical, electrical or plumbing systems that should be assessed to determine whether an issue has occurred and, if not, generate a probability model to determine a likelihood of an issue occurring. For instance, the home or structure 202 may include a HVAC system, hot water heater, etc. Further, the home or structure may include various appliances, such as a washer, dryer, dishwasher, and the like. The home or structure 202 may further include various structural aspects that may be in need of repair or replacement, such as a roof, foundation, exterior finish (e.g., paint, brick, stone, etc.). Further still, the home or structure 202 may include additional structures, such as a garage, shed, and the like, that may also be included in an assessment.

In some examples, the various systems, features, etc. of the home may be assessed to determine a probability that an issue will arise. In some examples, the systems described herein may be used to provide assistance to a user when an issue has occurred. For instance, if a user identifies a problem in the home or structure, but does not know the cause or how to address the issue, the user may request assistance via the arrangement.

Further still, a user may be interested in obtaining an insurance quote on the home or structure 202. For each of these scenarios, information associated with the home 202 may be collected and the system may generate a probability of an issue occurring, may assist in identifying a cause of an issue and/or addressing the issue, and/or may generate an insurance rate quote. In some examples, this information may be collected via a computing device 203 associated with the structure 202 or a user associated with the structure. For instance, the probability of an issue occurring may be transmitted to the computing device 203 and/or the user may provide information to assist in addressing an issue or obtaining an insurance rate quote via the computing device 203.

This information may be transmitted to a data collection system 206. The data collection system 206 may be connected to or in communication with the home 202 (or a device 203 associated with the home). In some arrangements, information may be transmitted directly from the home 202 or device 203 associated with the home to the data collection system (or to the insurance system 208). In other arrangements, the information may be transmitted to a base unit 204 and then transmitted to the data collection system 206 (or insurance system 208).

The arrangement 200 may further include an entity, such as an insurance company, having a system 208 for further analyzing or processing the data. In some examples, the data received and associated with the home may be transmitted either from the data collection system 206 or directly from the home 202 or device 203 associated therewith. This arrangement permits data associated with the home to be collected and stored (e.g., at data collection system 206) without transmitting the data to the insurance company system 208, unless the user desires to transmit the data to the insurance company system 208. Accordingly, the user may choose to share the structure data with the insurance company or not. However, the insurance company may offer insurance discounts, rebates, incentives, etc. if the user shares the structure data with the insurance company, as will be discussed more fully below.

The arrangement 200 in FIG. 2 is merely a schematic example of one home assessment arrangement. The data transmissions may be made from various types of devices or systems without departing from the invention. Further, any data transmission may be made via wired or wireless connection and/or may be made to a base collection unit 204 directly or to a system 206, 208 directly (e.g., from the home 202 or device 203). The collected data may be used to assess various systems or features of the home or structure 202, to prioritize identified issues and/or provide incentives or discounts to users, and the like. Various uses of the collected data will be discussed more fully below.

Figure 3:
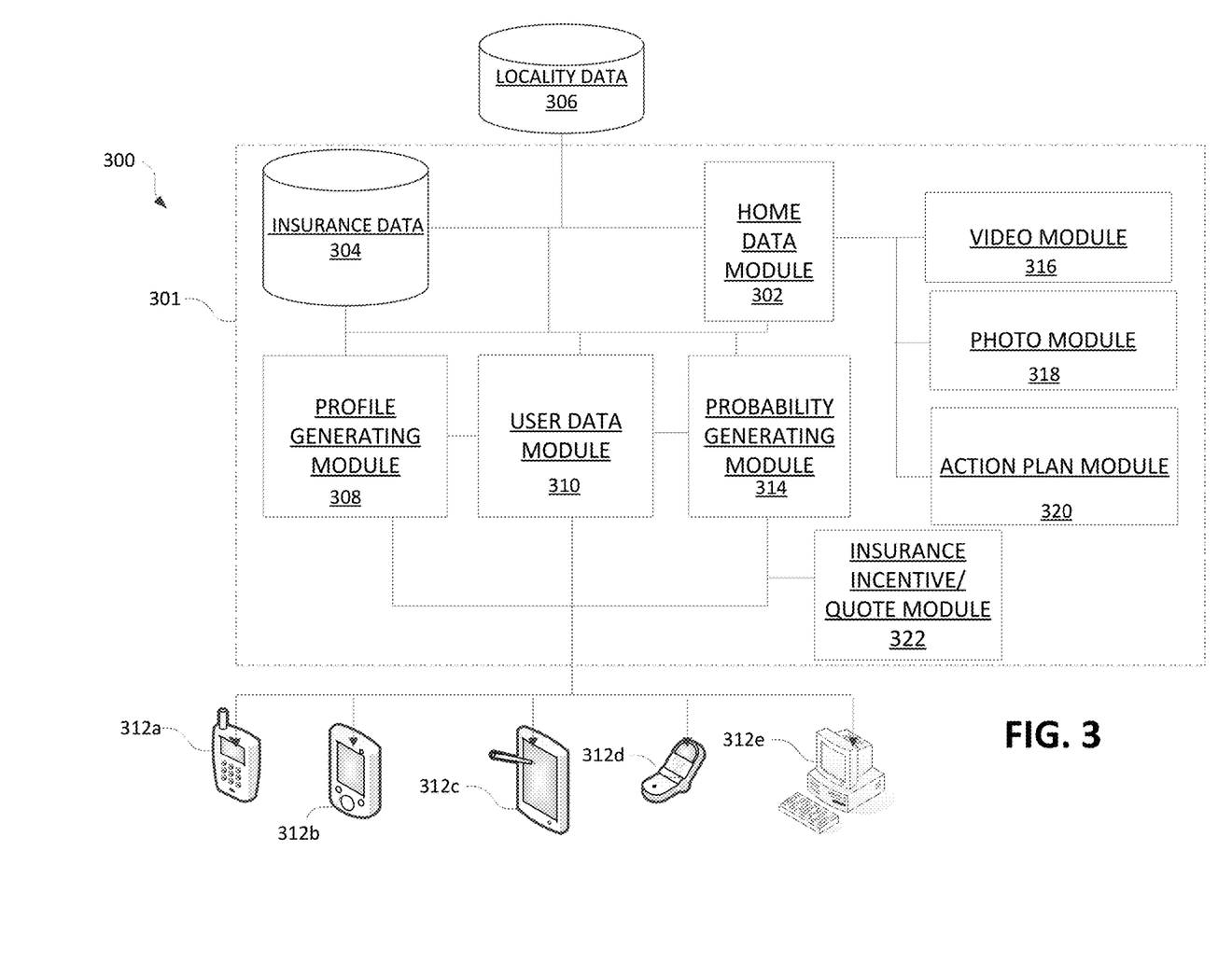
FIG. 3 is an example home assessment system according to one or more aspects described herein.

FIG. 3 illustrates one example home assessment system 300. Each component shown in FIG. 3 may be implemented in hardware, software or a combination of the two. Additionally, each component of the home assessment system may include a computing device (or system) having some or all of the structural components described above for computing device 101. In some arrangements, some or all of the components of system 300 may be housed in a single physical device. Alternatively, some or all of the components may be housed in separate physical devices.

The home assessment system 300 may be associated with an entity 301. For instance, the system 300 may be implemented by an entity 301, such as an insurance company. In other examples, the system 300 may be implemented by various other types of companies, universities, government entities, and the like. Several examples discussed herein will be described in the context of an insurance company. Further, one or more components of the system might not be associated with or may be external to the entity. For instance, one or more data stores may be a data store of publicly available information that is accessed by the system 300. These and other examples will be discussed more fully below.

The home assessment system 300 may include a plurality of modules. The modules may be implemented in hardware and/or software and may be configured to perform one or more functions within the system 300. For instance, the home assessment system 300 may include a home data module 302. The home data module may receive and/or store information associated with one or more structures or homes. For instance, the home data module 302 may store information such as the age of the home, location of the home, types of systems or structures within the home (e.g., type of roof, type of building materials used, etc.).

The home data module 302 may be connected to or in communication with insurance data store 304. The home data module 302 may receive data from the insurance data store 304 associated with the home or structure, the locality or neighborhood of the home or structure, as well as additional homes or structures within the locality or neighborhood. For instance, data such as crime statistics, insurance claim data for a neighborhood or region, information about systems, items, etc. within neighboring homes, maintenance or improvements to neighboring homes, and the like, may be transmitted from the insurance data store 304 to the home data module 302. In some examples, the insurance data store 304 may also store information associated with the particular home or structure being assessed, such as type and age of appliances that are insured, any recent insurance claims associated with the structure, and the like.

The home data module 302 may also be connected to or in communication with locality data store 306. As shown in FIG. 3, locality data store 306 may be external to or not associated with the entity 301 (e.g., an insurance provider) and, in some arrangements, may be publicly available information. In some examples, locality data store 306 may be internal to or associated with the entity 301 or may include multiple data stores, some of which are internal to the entity 301 and some of which are external to the entity 301.

Locality data store 306 may include information associated with cost of living in a locality, tax rates of the locality, crime statistics, historical weather data of the locality, and the like. For instance, locality data store 306 may include information indicative of weather patterns or trends that may have an effect on the structure. For example, areas that frequently have high winds or regular occurrences of hail might see a reduction in the life of a roof. The locality information for the location of the home or structure being assessed may be transmitted from the locality data store 306 to the home data module 302.

The home data module 302 may process the information associated with the home or structure, locality or neighborhood, neighboring homes or structures, etc. The processed information may then be used to generate a profile of the home or structure by the profile generating module 308. The profile of the home or structure may include details regarding the structure such as age, materials used in building the structure, types of appliances within the structure, age of appliances, maintenance or repairs performed, etc. For instance, the profile may include a listing of systems, features, items, etc. that should be or may be evaluated to determine whether there is a probability of an issue arising with an item. For instance, the home profile may include items such as roof, exterior finish, driveway, foundation, appliances, plumbing system, HVAC system, electrical system, etc., as well as a condition (or expected or estimated) condition of each item. The condition may be determined based on received user input (e.g., received from computing device 312) or from data obtained from other sources (e.g., insurance data store 304, neighboring home information, locality information, etc.).

In some examples, the profile may be accessed by a user (e.g., a homeowner) and may be updated by the user. For instance, a user may access the home profile via a computing device, such as computing devices 312a-312e and may provide additional information, update information, etc. The user may use any type of computing device 312, including but not limited to a smartphone 312a, personal digital assistant (PDA) 312b, tablet computing device 312c, cell phone 312d or other type of computing device 312e.

Based on the information received about the home, neighborhood, neighboring homes, etc. the system 300 may generate a probability model indicating a probability or likelihood that one or more issues with arise with the home or an item within the home. The probability model may be generated by a probability generating module 314. The probability model may be generated based on data known about the structure (e.g., age, materials, etc.), about items associated with or within the structure (e.g., age of roof, condition of roof, age of hot water heater, etc.), locality data (e.g., historical weather data that may indicate factors having an effect on a structure (e.g., high winds, regular occurrences of hail, etc.)) and/or data associated with other structures within the neighborhood (e.g., homes in neighborhood tend to have a hot water tank failure earlier/later than a national average, home in the neighborhood require roof replacement/repair earlier/later than national average, etc.). This information may, in some examples, be provided by an insurance provider (e.g., insurance data store 304) and may include information collected over several years.

The probabilities generated may, in some examples, be stored in the home profile such that a user may access the profile, be aware of the probability of one or more issues arising and take action to avoid an issue arising.

The system 300 may further include an action plan module 320. The action plan module 320 may receive data associated with the home or structure, locality, other homes, etc., as well as the home profile and probability model to develop an action plan for the user. The action plan may include a ranking or prioritized list of issues that are likely to occur. For instance, if the probability model indicates that a roof replacement is likely to be needed and the sump pump is likely to fail, the action plan module 320 may rank those probable issues and provide the user with a recommended order in which the issues should be addressed.

In some examples, the user may provide constraints or parameters to include in the ranking. For instance, if a user has a limited budget for home repairs, the user may provide the budget to the system and the action plan module 320 may factor in the budge when prioritizing the identified probable issues. In another example, a user may have a goal, such as selling the home within a certain time period. Accordingly, this goal may be provided to the system and the action plan module 320 may consider the goal when ranking or prioritizing items (e.g., may rank higher items that add curb appeal or are selling points for a home). Accordingly, the criteria used to rank or prioritize the identified issues or probable issues may be based on factors provided by the entity 301 implementing the system (e.g., from a risk or damage minimization standpoint) and/or by the user (e.g., from a personal goal and/or budget standpoint).

The action plan generated by the action plan module 320 may further include a cost estimate associated with the identified issues that are likely to occur. For instance, the action plan may include an estimate of a cost to repair the potential issue at the current time (or within a predetermined elapsed time after generating the action plan) or in the future. The estimated cost of repair provided may, in some examples, include potential damage to other systems or items within the structure that may be caused by the issue (e.g., roof in need of replacement may leak causing damage to walls, etc. which may increase repair costs). Accordingly, a user may be able to determine whether it is advantageous to repair the item now (e.g., before an issue exists or shortly after an issue exists) or wait until the issue actually occurs or worsens.

In some examples, the system 300 may further determine (or provide an indication of) whether addressing an issue or an issue identified as probable will be covered by an insurance policy. For instance, insurance incentive/quote module 322 may further include information associated with an insurance policy of the user and may determine whether a repair/replacement is covered, whether a deductible would apply, how much the deductible would cost, etc. In some examples, the insurance incentive/quote module 322 may generate one or more insurance incentives (e.g., discounts, rebates, etc.) to address an issue before it occurs (e.g., based on the probability of it occurring identified in the probability module), as will be discussed more fully below.

The system 300 may further include a user data module 310. The user data module 310 may receive data from the user that may be used to assist in an assessment of the home or structure. For instance, in some arrangements, an issue may arise with a home. The user or homeowner may be unsure what the cause of the issue is or how to address it. Accordingly, the user may submit a request to the system 300 for assistance. The request may be made via computing device 312 and may include a description of the issue or problem transmitted to the user data module 310. The user data module 310 may then determine or identify additional information that may be helpful in determining a cause of the issue and may request that additional information from the user (e.g., via computing device 312).

In some arrangements, video or photographic images of the issue may be useful in addressing the issue. Accordingly, the user may submit video images or photographic images that may be stored in video module 316 or photo module 318, respectively. In some examples, the images may be submitted in real-time or near real-time such that an expert or other third party may review the images, in conjunction with the data provided, to assist in determining a cause of an issue and/or action plan to address the issue.

The action plan module 320 may further generate an action plan for addressing an issue once the cause has been determined. For instance, the action plan module 320 may generate an action plan including a proposed course of action, an estimate of the cost of the repair or replacement, and/or information about a contractor or other individual who may assist with implementing the action plan, performing the repair, and the like. The action plan may be transmitted to a user or a computing device of the user. In some examples, the action plan may be interactive such that a user may check-off or mark complete any aspects of the action plan as they are completed.

In some arrangements, the action plan provided to the user may include additional instructions regarding the repair of the issue. For instance, information may be provided in the action plan that may assist the user in performing the repair or replacement. For instance, the action plan may include a list of parts and/or tools needed to perform the repair, instructions or an instructional video providing guidance for completing the repair, and the like.

The system 300 may further be configured to provide an insurance quote to a user. For instance, a user may request a quote for insurance associated with the structure. The request may be received by the user data module 310 and may include information associated with the structure. The information may be transmitted to the insurance incentive/quote module 322 and may be aggregated with addition information associated with the structure (e.g., from home data module 302, insurance data store 304 and/or locality data store 306). In some examples, the user may provide additional information, for instance, via one or more computing device, such as devices 312a-312e. Additionally or alternatively, a user may provide video and or photographic images of the structure or different portions of the structure, items within the structure, etc. so that the condition of the structure and items therein may be assessed to provide the insurance quote. The images provided may be stored, for example, in video module 316 and/or photo module 318. In some examples, the images may be added to a home profile generated by the profile generating module 308.

In some examples, the system 300 may detect a location of a user (e.g., by detecting a location of a computing device of the user). Systems such as Global Positioning (GPS) may be used to determine a location of a user within a structure. Accordingly, the system (e.g., user data module 310) may request specific information about the location of the user to be used in generating the insurance quote. For instance, if the computing device of the user is detecting in a kitchen area of the structure, the system may prompt the user with images and/or question associated with kitchen safety, kitchen features, etc. For example, an image of a fire extinguisher may appear and the user may be requested to verify whether a fire extinguisher is present in the kitchen. In some examples, video and/or photographic images may be used to confirm this information. The images may include time and/or data stamps to further verify the authenticity and accuracy of the information being provided.

The insurance incentive/quote module 322 may, based on the information from the user as well as the other information received, generate an insurance rate quote for the user to insure the structure.

Further, in situations in which a user already has insurance through the insurance provider implementing the system, one or more aspects of the assessments provided by the system may be used to generate insurance incentives, such as rebates, discounts, etc. For instance, if a user requests assistance from the system to address issues, the insurance incentive/quote module 322 may generate an insurance incentive to offer to the user if the user addresses the issue within a predetermined amount of time (e.g., to encourage the user to address the issue quickly). In another example, when a probability model is generated for a structure or home, the insurance incentive/quote module 322 may further generate one or more insurance incentives to address any issues identify as likely to occur within a predetermined amount of time, or to address them in the order in which the system has prioritized them, etc. In still other examples, an insurance incentive may be generated an offered to the user if the user engages a preferred contractor (e.g., a contractor from a list of preferred contractors maintained by the entity 301 implementing the system or insurance provider) to assist with addressing any issues. Various other insurance incentives may be generated based on implementations of the system without departing from the invention.

Various aspects of the systems discussed above will be discussed more fully below.

Figure 4:
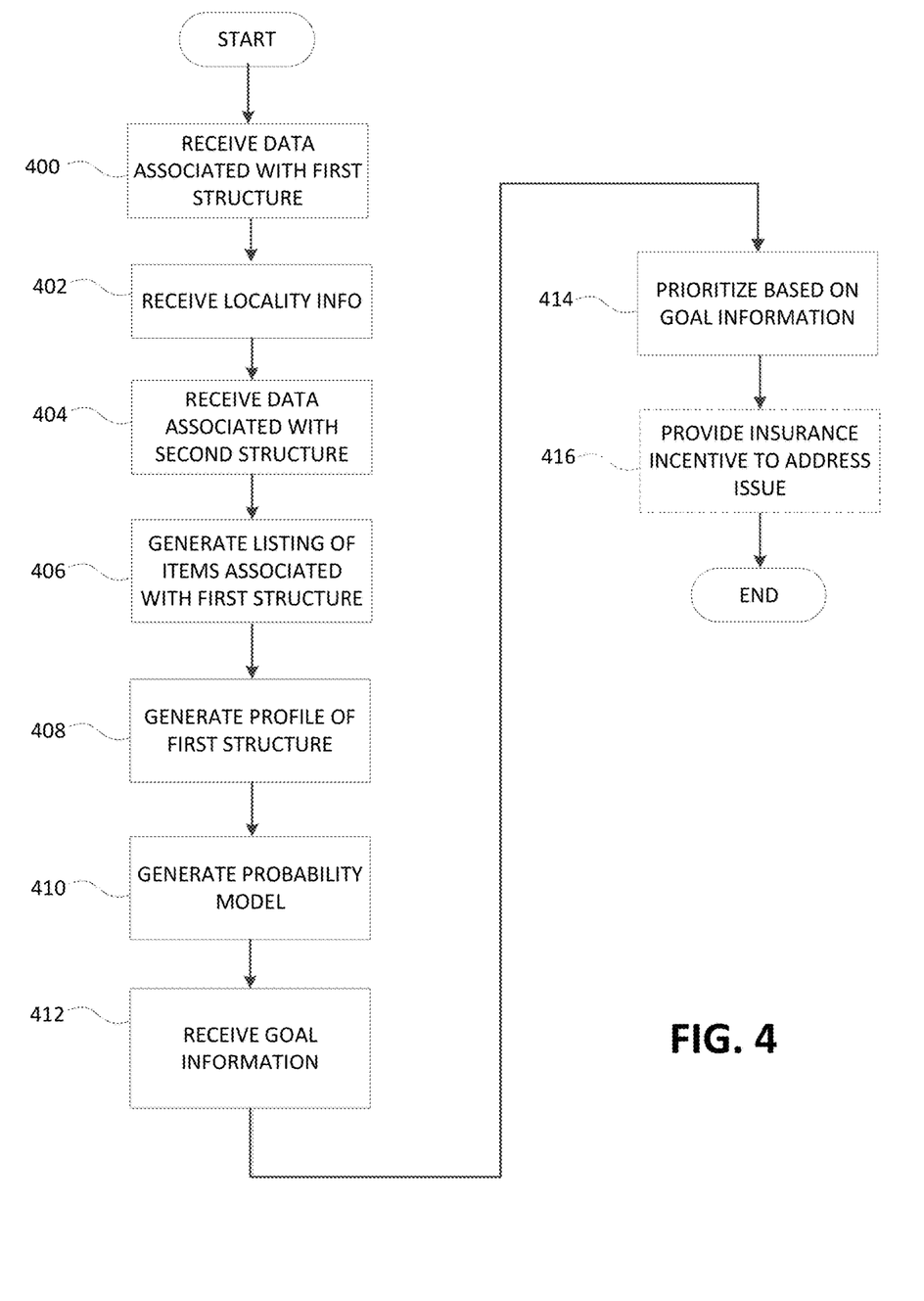
FIG. 4 is a flow chart illustrating one example method of evaluating or assessing a home and generating a probability model indicating a likelihood of issues arising with one or more aspects of the home according to one or more aspects described herein.

FIG. 4 illustrates one example method of evaluating or assessing a home and generating a probability model indicating a likelihood of issues arising with one or more aspects of the home according to one or more aspects described herein. In step 400, data associated with the structure being evaluated (e.g., a first structure) is received. The data may be publicly available data associated with the age of the house, utility information, tax information, tax assessment information, etc. In some examples, the information may include particular features or aspects of the home, such as items obtained from an insurance provider insuring the home. For instance, data such as size of the home, number of rooms, number of bedrooms, number of bathrooms, etc. may be received. In still other examples, information about the contents of the home may be received. For instance, information about appliances and/or systems within the home may be received, for example, from the insurance provider and/or from the user. Various other information associated with the home or structure may also be received.

In step 402, locality information associated with the structure may be received. For instance, information such as crime statistics, tax or income information, historical weather data, and the like, may be received.

In step 404, data associated with a second structure may be received. In some examples, the second structure may be another home or structure in the same or similar locality or neighborhood as the first structure. For instance, an insurance provider may store information associated with structures in the same or similar locality or neighborhood and some or all of that information may be used in assessing the first structure. For instance, information about replacement or repair of various portions of the second structure, claim information associated with the second structure, etc. may be used. Also, data associated with additional structures may be received as well.

In step 406, a listing of items associated with the first structure may be generated. For instance, a listing of items or portions of the structure that should be or are recommended for evaluation or assessment may be generated. The listing may include items such as a roof, foundation, driveway, exterior finish, appliances, electrical system, plumbing system, and the like. This listing may be added to a home profile generated in step 408. The home profile may include the items identified in the listing, as well as a condition or expected condition of the item (e.g., based on age, materials, historical data, maintenance data, data from similar items in other structures, etc.). As discussed above, the home profile may be interactive and may include information received from the user. In some examples, the home profile may be configured to be updated directly by the user (e.g., via a computing device).

In step 410, a probability model may be generated. The probability model may include a probability or likelihood that an issue will arise with one or more of the items in the home profile. For instance, in some examples, some or all of the items in the home profile may be evaluated or assessed. The assessment may include receiving user input associated with an item (e.g., via a user computing device), video or photographic images provided (e.g., by the user) indicating a condition of the item, and/or a projected condition of an item based on data received, such as age, materials used, historical data, data from other similar structures, and the like.

The assessment results, as well as the other data received, historical data, etc. may be used to determine a probability model indicating a likelihood that an issue will arise with one or more items in the home profile. For instance, if an assessment indicates that a user's hot water heater is functioning but other data indicates that the age of the hot water heater is 15 years and neighborhood data indicates that hot water heaters typically fail between 10 and 12 years, the probability model may indicate that a hot water heater failure is likely to occur.

In some examples, the probability model may indicate a predetermined time period in which an issue is likely to arise. For instance, within 6 months, within 1 year, within 5 years, etc. This may aid in prioritizing and/or addressing issues.

In some examples, the method may include a goal of the user which may be used or considered in developing a ranking or prioritized list of issues. For instance, in step 412 goal information may be received. The goal information may be received from, for instance, a user via a computing device. The goal information may include a budgetary goal, an overall goal such as a desire to sell the home, a time period goal (e.g., would like to have most upgrades done within two years), or the like.

In step 414, any issues or probable issues identified via the probability model may be ranked and prioritized, based at least in part, on the received goal information. For instance, the system may determine a severity or urgency of each issue or potential issue and rank them in order to provide a recommended order in which the issues or potential issues should be addressed.

In optional step 416, one or more insurance incentives may be generated and provided to the user. For instance, the system may offer the user a discount or rebate on an insurance premium if the items are handled in the recommended priority order. Various other incentives may be generated without departing from the invention.

Figure 5:
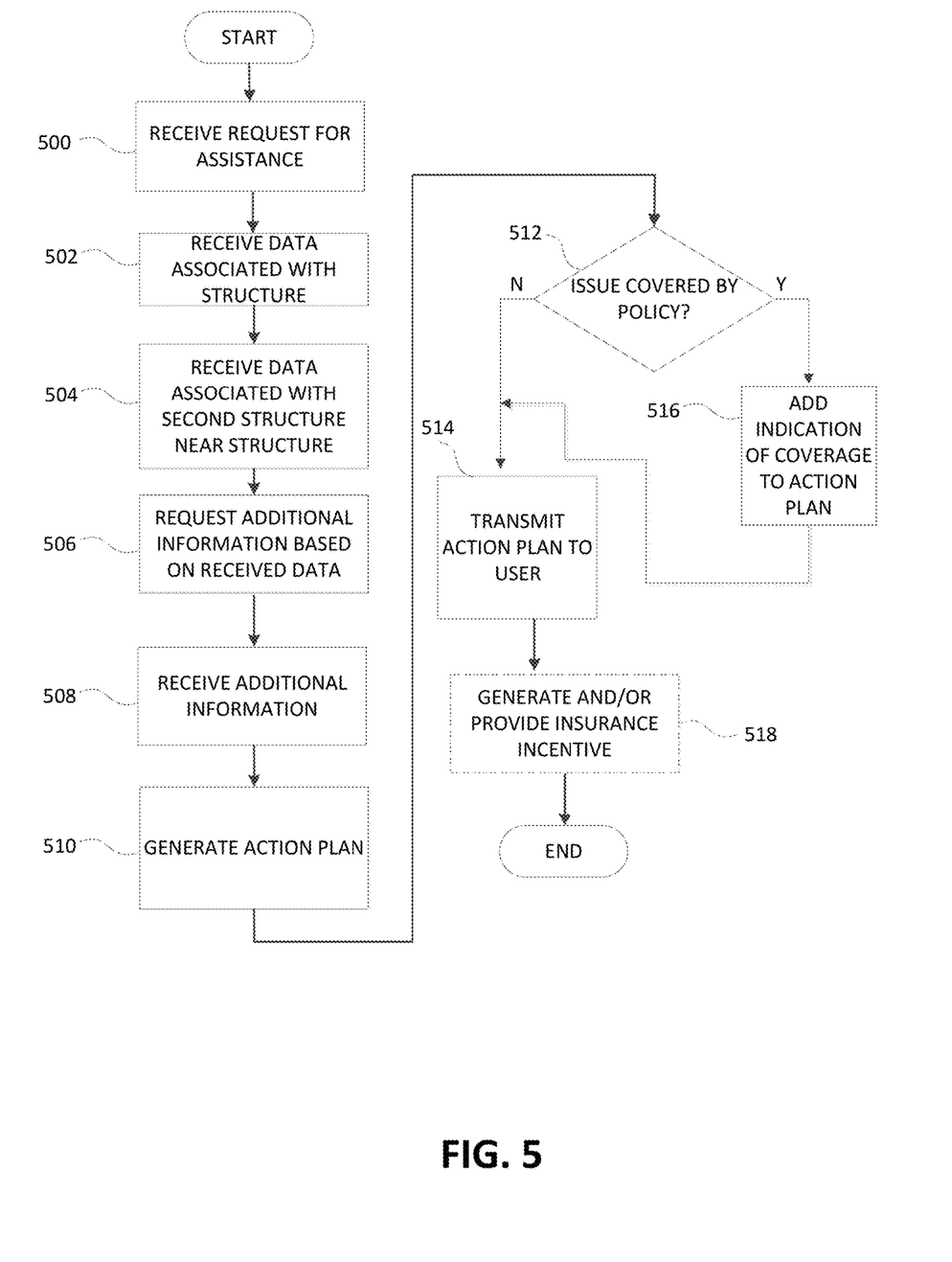
FIG. 5 is a flow chart illustrating one example method of requesting assistance from the home assessment system in order to identify a cause of an issue and address the issue, according to one or more aspects described herein.

FIG. 5 illustrates one example method of requesting assistance from the home assessment system in order to identify a cause of an issue and address the issue, according to one or more aspects described herein. In step 500, a request for assistance may be received. For instance, a user may notice an issue within a home or structure and be unsure of the cause or how to address the issue. Accordingly, the user may access the system (e.g., via a computing device) and request assistance with addressing the issue.

In step 502, data associated with the structure may be received. The data associated with the structure may include publicly available information, such as location, size, etc., as well as information obtained from, for instance, an insurance provider such as age of home, type of structure, condition of structure, maintenance or claim history and the like. The received data may include information provided by the user, such as a description of the issue, and the like.

In step 504, data associated with a second structure near the structure or home of the user may be received. That data associated with the second structure may include publicly available information as well as other data that may be received from, for instance, an insurance provider. As discussed above, types of data received may include age of the home, maintenance or claim history, etc.

Based on the received data, additional information may be requested in step 506. For instance, the received data may aid in narrowing down a cause of the issue but additional information may be desired in order to further identify the cause of the issue and develop and appropriate course of action to address the issue. The additional information requested may be generated based on the content of the received information. In some examples, the additional information requested may include video and or photographic images of the issue or a portion of the home.

In step 508 the additional information is received. If, based on the received additional information, any further information is desired, a request might be placed to the user. However, if sufficient information has been received, in step 510 an action plan may be generated. The action plan may include a likely cause of the issue, a suggested or recommended course of action to repair or remedy the issue, an estimated cost to repair the issue, a suggested contractor or other expert to perform any repair work, actions that can be taken in order to prevent further or related issues from occurring, and the like.

In some examples, the system may also determine whether the identified issue may be covered by an insurance policy. Accordingly, in step 512, a determination may be made as to whether the issue is covered by the policy. The determination may include retrieving a policy associated with the home and evaluating the coverage. The determination may also be a preliminary determination and may be subject to an inspection, or other additional criteria being met.

If, in step 512, it is determined that the policy does not cover the identified issue, the action plan may be transmitted to the user (e.g., to a computing device of the user) in step 514. Alternatively, if the issue is covered by a policy, the action plan may be modified to include an indication that the issue may or is covered by one or more insurance policies and may provide contact information for the user to contact an agent or other insurance provider contact. In some examples, the system may provide a link or other information to initiate a claim or the system may provide an indication to an agent associated with the user instructing the agent to contact the user. Once the indication of the insurance coverage has been added, the action plan may be transmitted to the user in step 514.

Optionally, in step 518, one or more insurance incentives may be generated and provided to the user. For instance, if the action plan includes a recommended contractor to assist in the repair of the issue, the contractor may be deemed a preferred contractor by the insurance provider. Accordingly, the insurance provider may offer the user an insurance incentive (such as a discount, rate reduction, etc.) to have the preferred contractor perform the work.

Figure 6:
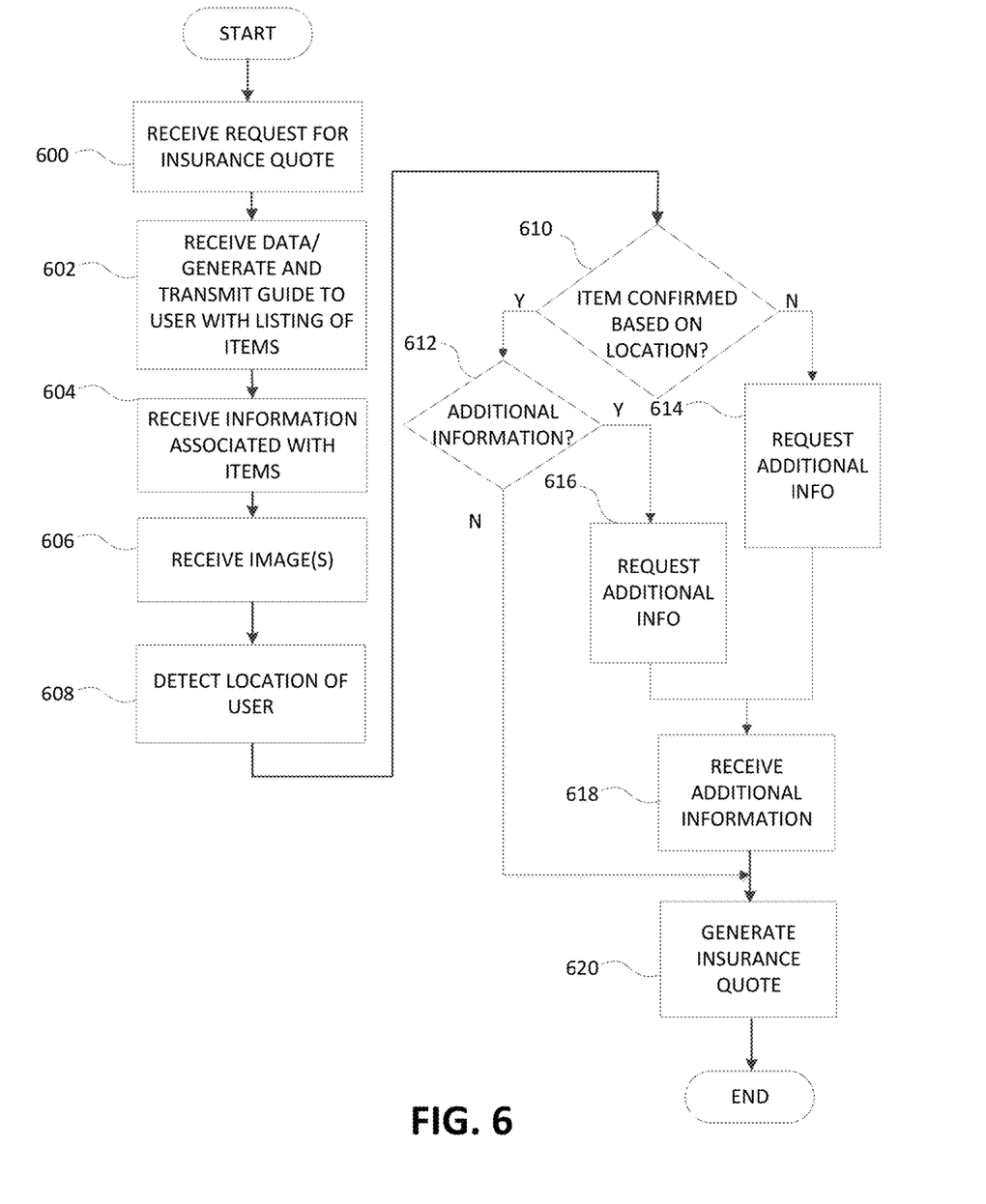
FIG. 6 is a flow chart illustrating one example method of requesting an insurance quote via the home assessment system according to one or more aspects described herein.

FIG. 6 illustrates one example method of requesting an insurance quote via the home assessment system according to one or more aspects described herein. In step 600, a request for an insurance quote may be received by the system. For instance, a user may request an insurance quote for a home or structure via a computing device.

In step 602, information may be received associated with the home or structure for which the quote is being requested. Similar to various arrangements discussed above, the received information may include information associated with the structure, items within the structure, locality of the structure, other structures in the same neighborhood or locality, etc. Based on the received data, the system may generate a listing of items for which information may be provided in order to obtain the quote. For instance, the listing of items may include questions regarding the condition of the roof, foundation, condition of systems within the structure, condition of items within the structure, and the like. The listing may be provided to the user in a guide with further information and/or instructions for providing the desired or requested information.

In step 604, information associated with the items in the listing of items may be received. In some examples, the information may be provided via a computing device of the user. The information may include an age of the item, condition of the item, repair or maintenance history of the item, etc. In some examples, the information received may include one or more images, as in step 606. The images may include video and/or photographic images and may be provided of particular items to provide confirmation of the condition of the item.

In step 608, a location of a user within the structure may be detected. For instance, technology such as Global Positioning Systems (GPS) may be used to determine a location of a user or computing device associated with the user. For example, if a user is gathering and providing information to the system via a smartphone or tablet computer, the location of the device within the home may be detected.

Based on the detected location, additional information may be requested. For instance, in step 610, additional confirmation of items may be requested based on the detected location. For instance, if the user is detected as being in a kitchen area of the home, the system may request confirmation that a fire extinguisher is located in the kitchen. If, in step 610, a user confirms the presence of an item, a determination may be made by the system whether further additional information is desired. For instance, for some items the system may request a video or photograph confirming the status or condition of the item. Accordingly, in step 612 a determination is made as to whether further information is desired. If so, the information may be requested in step 616 and may be received in step 618. If not additional information is desired, the system may generate the insurance rate quote in step 620 and/or provide the quote to the user.

If, in step 610, the user does not provide additional confirmation of items, additional information may be requested in step 614. For instance, details regarding the item or absence of an item may be requested. In some examples, alternatives to the item may be suggested or information requested. For instance, if a user does not have a fire extinguisher in the kitchen, the system may inquire as to whether a sprinkler system exists in the home or structure. Additionally or alternatively, the system may request information as to the approximate distance to the nearest fire extinguisher if it is not located in the kitchen. In step 618, the additional information may be received.

In step 620, as indicated above, the system may generate and/or provide an insurance rate quote to the user. In some examples, the quote generated may include one or more insurance incentives based on the information, images, etc. provided by the user.

Although the process described in FIG. 6 is described in the context of obtaining an insurance quote, a similar process may be used to modify insurance coverage, request a rate adjustment, modify a deductible, or the like.

Figure 7:
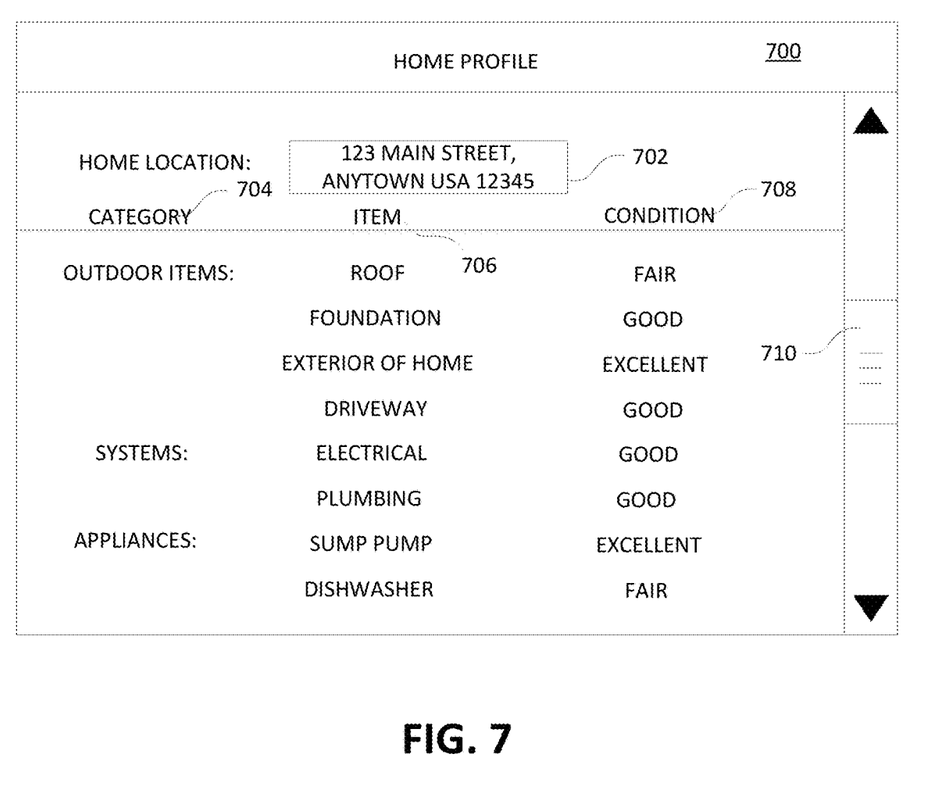
FIG. 7 illustrates one example home profile according to one or more aspects described herein.

FIG. 7 illustrates one example home profile according to one or more aspects described herein. The home profile may be contained in a user interface 700 that may permit selection of one or more items. Selection of one or more items may prompt additional user interfaces that may be used to update information about an item, add or delete items, and the like.

The interface 700 includes field 702 in which the location of the home associated with the home profile is provided. The interface 700 further includes a listing of items associated with the homes. Different categories of items are provided in column 704. For instance, the items may be divided into outdoor, systems, appliances, and the like. Column 706 provides a listing of the various items and field 708 provides a condition of the item. The condition may be projected based on information associated with the age, materials, etc. of the item. The condition may also be provided by a user associated with the home.

Additional items may extend beyond the visible portion of the interface 700 and may be viewed and/or accessed using scroll bar 710.

The items shown in the example home profile 700 are merely some example items and associated information that may be provided. Various other items and associated information may be provided in the home profile without departing from the invention.

Figure 8:
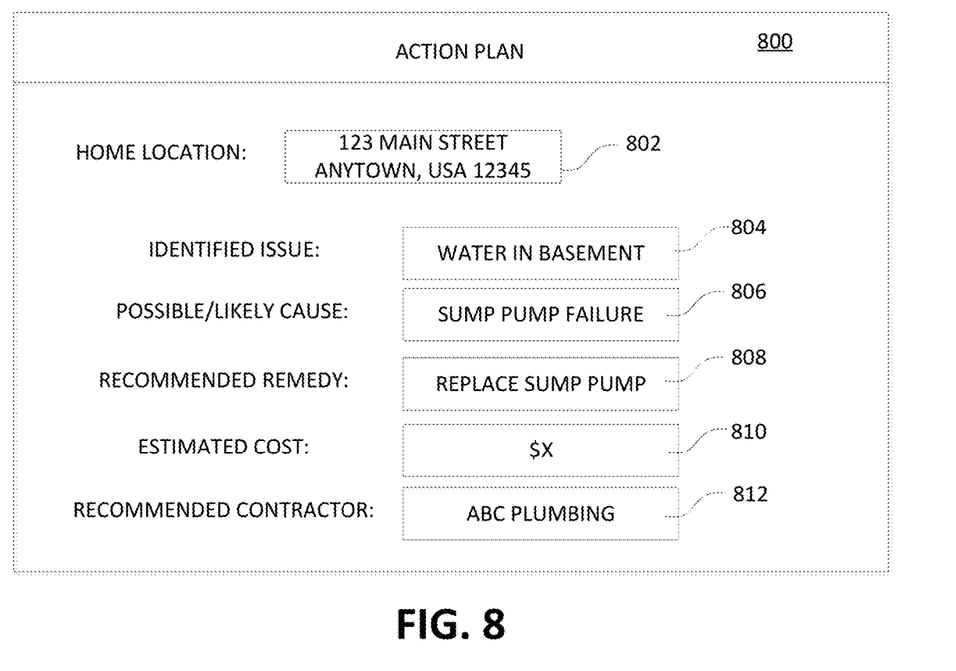
FIG. 8 illustrates one example action plan generated according to one or more aspects described herein.

FIG. 8 illustrates one example action plan according to one or more aspect described herein. The action plan may be provided via a user interface 800. Field 802 may include an identified location of the home for which the action plan is being generated. In the example shown, the action plan may be generated in response to a request for assistance. However, as discussed above, one or more action plans may be generated by the system in a variety of circumstances without departing from the invention.

Fields 804-812 provide various information associated with the issue and a recommended remedy for the issue. For instance, field 804 provides a description of the issue. In this example, the issue the user reported was water in the basement. In field 802, a likely cause of the issue is identified. In this example, a sump pump failure has occurred which is likely to lead to flooding in the basement. A recommended remedy is provided in field 808. In this example, the remedy includes replacement of the sump pump. Field 810 provides an estimated cost associated with the recommended remedy and field 812 provides a recommended contractor to perform the repair/replacement.

The items provided in the example action plan of FIG. 8 are merely some examples of information that may be provided. Various other types of information may be provided without departing from the invention.

The arrangements discussed herein may be used with various computing devices, as discussed above. For instance, a user may provide information to the system via a mobile device, such as a smartphone, that may be configured to capture and/or transmit video and/or photographic images, as well as data. Further, the system may analyze the received data to generate the various outputs (e.g., action plan, insurance quote, or the like). In some examples, a third party or other individual may also participate in the analysis process and aid in generating the various outputs. For instance, a contractor or other expert may review data and/or images received to aid in identifying a cause of an issue, an action plan to address the issue, and the like.

Although several arrangements discussed herein include receiving user input associated with an issue, a condition of an item, etc. In some examples, some or all of the data may be gathered and/or transmitted to the system via a computing device. For instance, one or more robotic systems may be used to evaluate a condition of an item and may transmit that information to the system. In one example, a robot may be used to evaluate the condition of roofing materials. That information may then be transmitted from the robot to the system for analysis.

The arrangements discussed herein aid users in evaluating various systems or items associated with a home or structure in order to determine or estimate when or if an issue will arise with a particular portion of the home or item within the home. Further, the arrangements discussed herein assist users in identifying a cause of an issue that has occurred and developing an action plan to address the issue. The systems and arrangements described herein provide an efficient and cost effective way to reduce risk associated with failure of one or more items within the home.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the invention.

What is claimed is:

1. A system, comprising:
a computer having a memory and a processor, the computer configured to:
receive, from a remote mobile device located within a first structure, first data associated with the first structure, wherein the first data includes data for one or more items within the first structure;
determine a location within the first structure, from among a plurality of different locations within the first structure, of the remote mobile device using a geographic positioning system;
associate the first data with the determined location;
receive second data associated with a locality of the first structure;
verify an authenticity of the second data by inspecting an electronic data stamp of the second data;
receive third data associated with a second structure in the locality of the first structure;
generate, based on the received first, second and third data, as well as the determined location within the first structure and specific information about the determined location within the first structure, a listing of items associated with the first structure, wherein the specific information comprises features and safety hazards associated with the determined location within the first structure;
generate, based on the received first, second and third data, a profile of the first structure, the profile including the listing of items; and
based on the received first data, second data, and third data, generate a probability model indicating a probability that an issue with one or more items in the profile of the first structure will occur within a predetermined amount of time.

2. The system of claim 1, wherein the received first data includes at least one of: an age of the first structure, a type of the first structure, materials used in the first structure, an age of appliances within the first structure, types of appliances within the first structure, and historical data associated with the first structure, wherein the historical data includes at least one of: modifications to the first structure, replacement of portions of the first structure, a date of modification, and a date of replacement.

3. The system of claim 1, wherein the received second data includes historical weather data.

4. The system of claim 1, wherein the received third data includes at least one of: a condition of the second structure, historical information associated with issues that occurred associated with the second structure, age of the second structure, and maintenance records of the second structure.

5. The system of claim 1, wherein the probability model indicates a likelihood of an issue arising within 6 months.

6. The system of claim 1, wherein the computer is further configured to:
receive a goal of a user associated with the first structure; and
generate a priority listing of issues associated with the one or more items likely to occur
based on the probability model, an order of the issues on the priority listing being based at least in part on the goal of the user.

7. The system of claim 6, wherein the goal of the user includes a budget of the user.

8. The system of claim 1, wherein the electronic data stamp includes at least one of a date stamp and a time stamp.

9. The system of claim 1, wherein the first structure includes a plurality of rooms, and wherein the determined location specifies one of the plurality of rooms.

10. The system of claim 1, wherein the second data includes real-time video of at least one item in the first structure, the listing of items including the at least one item.

* * * * *